United States Patent [19]

Mikoshiba et al.

[11] Patent Number: 4,926,440
[45] Date of Patent: May 15, 1990

[54] SPREAD-SPECTRUM COMMUNICATION APPARATUS

[75] Inventors: Nobuo Mikoshiba, 30-18, Yagiyama-Honcho 2-chome; Kazuo Tsubouchi, 30-38, Hitokita 2-chome, both of Sendai-shi, Miyagi-ken; Takeshi Tomioka, Sendai, all of Japan

[73] Assignees: Nobuo Mikoshiba; Kazuo Tsubouchi, both of Sendai, Japan

[21] Appl. No.: 300,568

[22] Filed: Jan. 20, 1989

[30] Foreign Application Priority Data

Jan. 21, 1988 [JP] Japan .................................. 63-011567

[51] Int. Cl.⁵ .............................................. H04K 1/00
[52] U.S. Cl. ...................................................... 375/1

[58] Field of Search ........................................ 375/1, 5.1

[56] References Cited

U.S. PATENT DOCUMENTS 4,423,517  12/1983  Dawno et al. .......................... 375/1
4,744,083   5/1988  O'Neill et al. ...................... 375/5.1
4,804,438   2/1989  Rouse et al. .......................... 375/1

Primary Examiner—Salvatore Cangialosi
Attorney, Agent, or Firm—Flynn, Thiel, Boutell & Tanis

[57] ABSTRACT

In a spread-spectrum communication apparatus using a convolver as a correlator, demodulating processes in a receiver apparatus using a carrier and a PN code are performed under a non-synchronous condition.

7 Claims, 17 Drawing Sheets

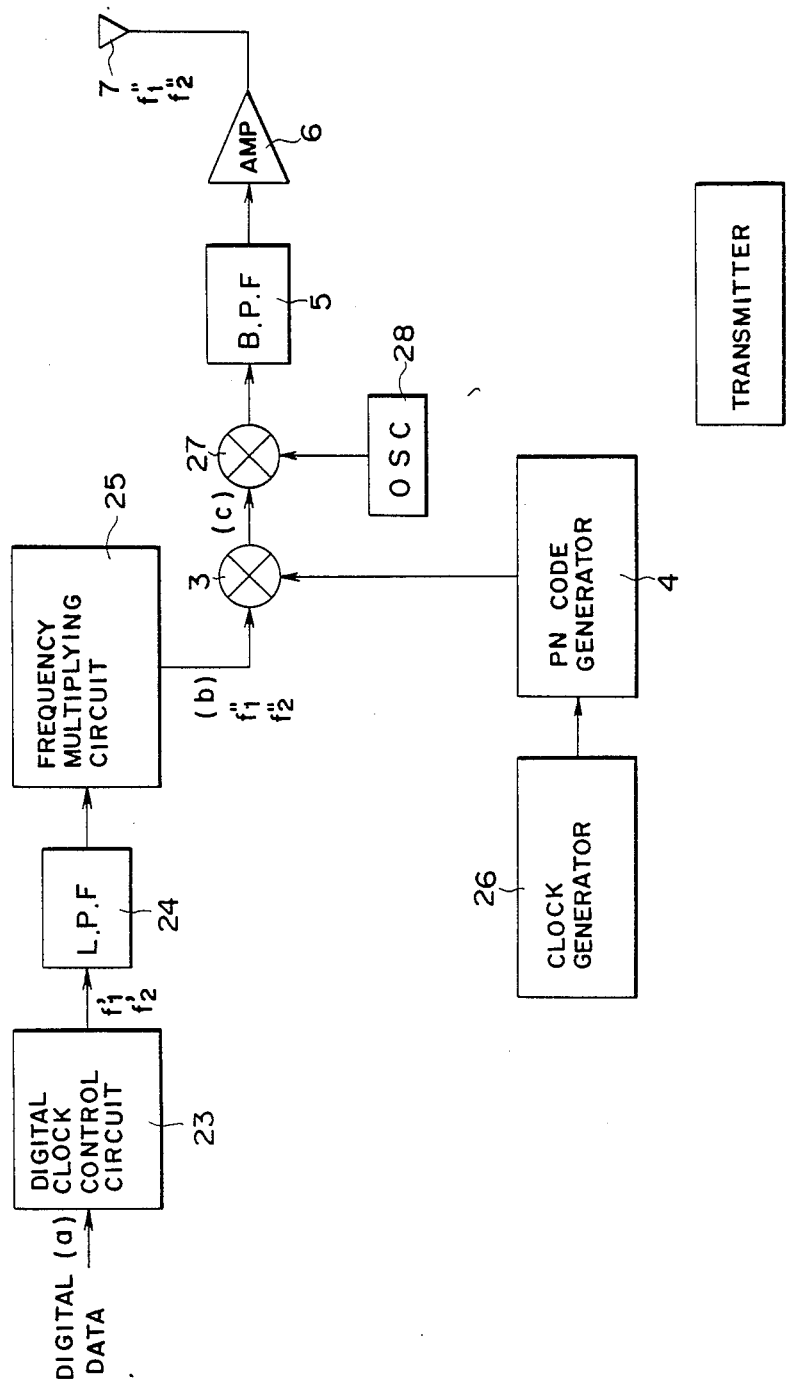

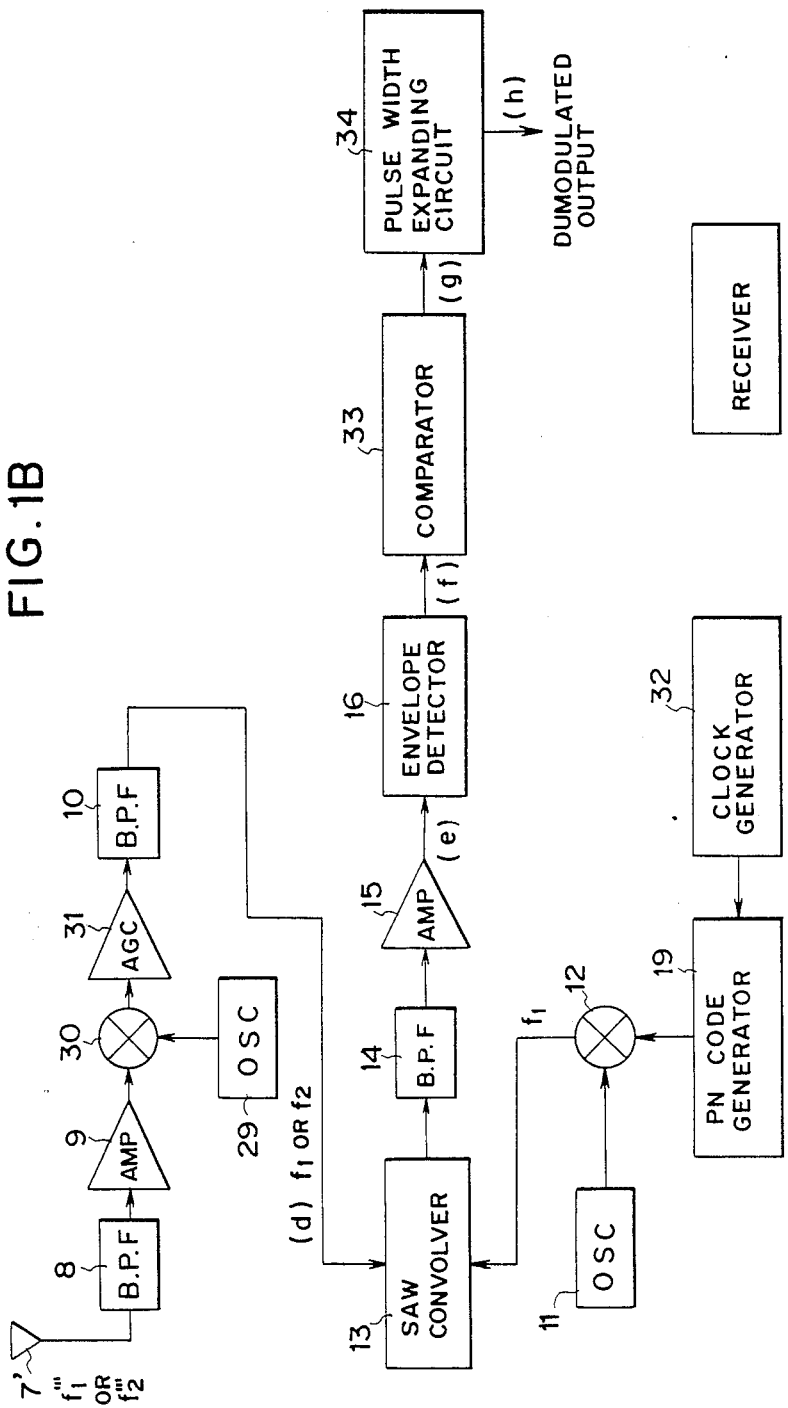

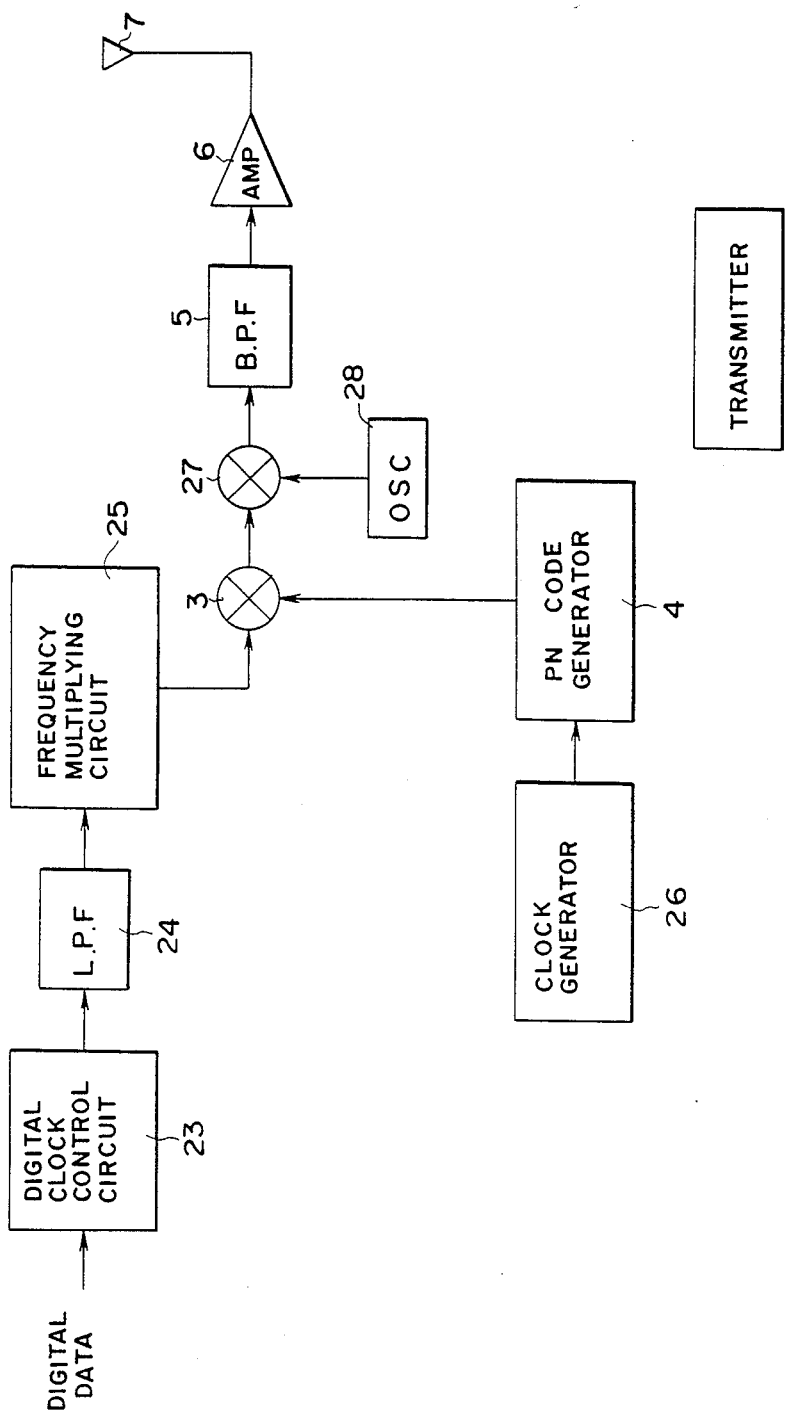

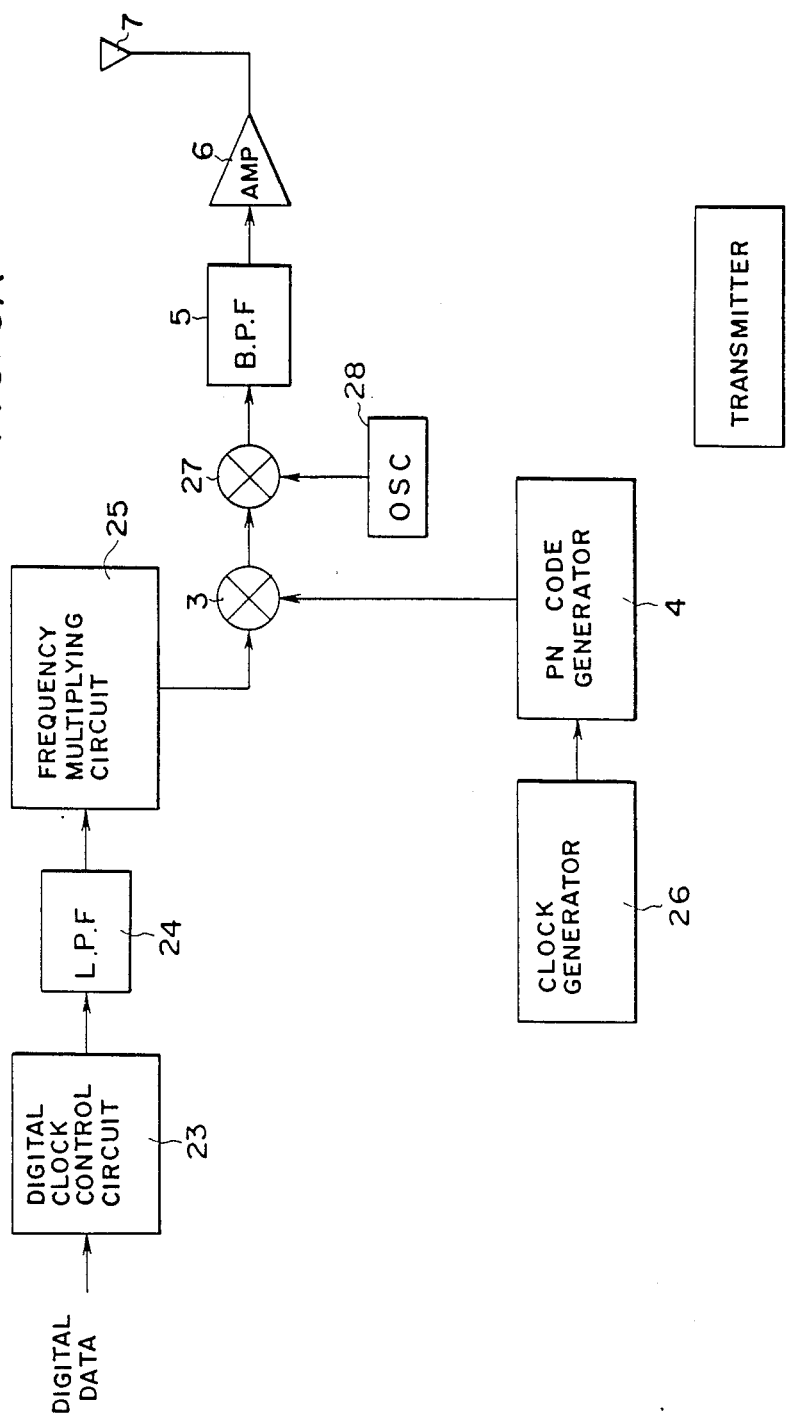

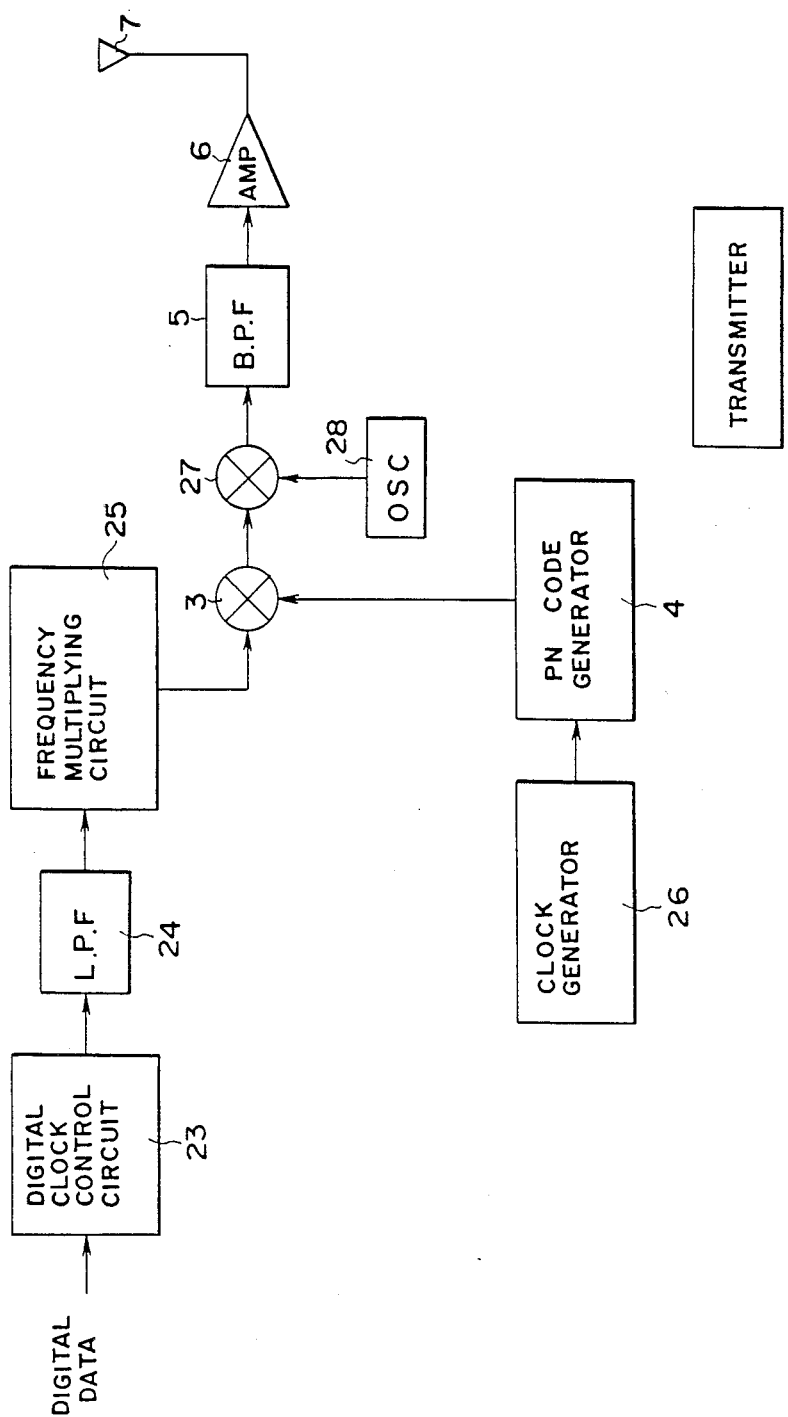

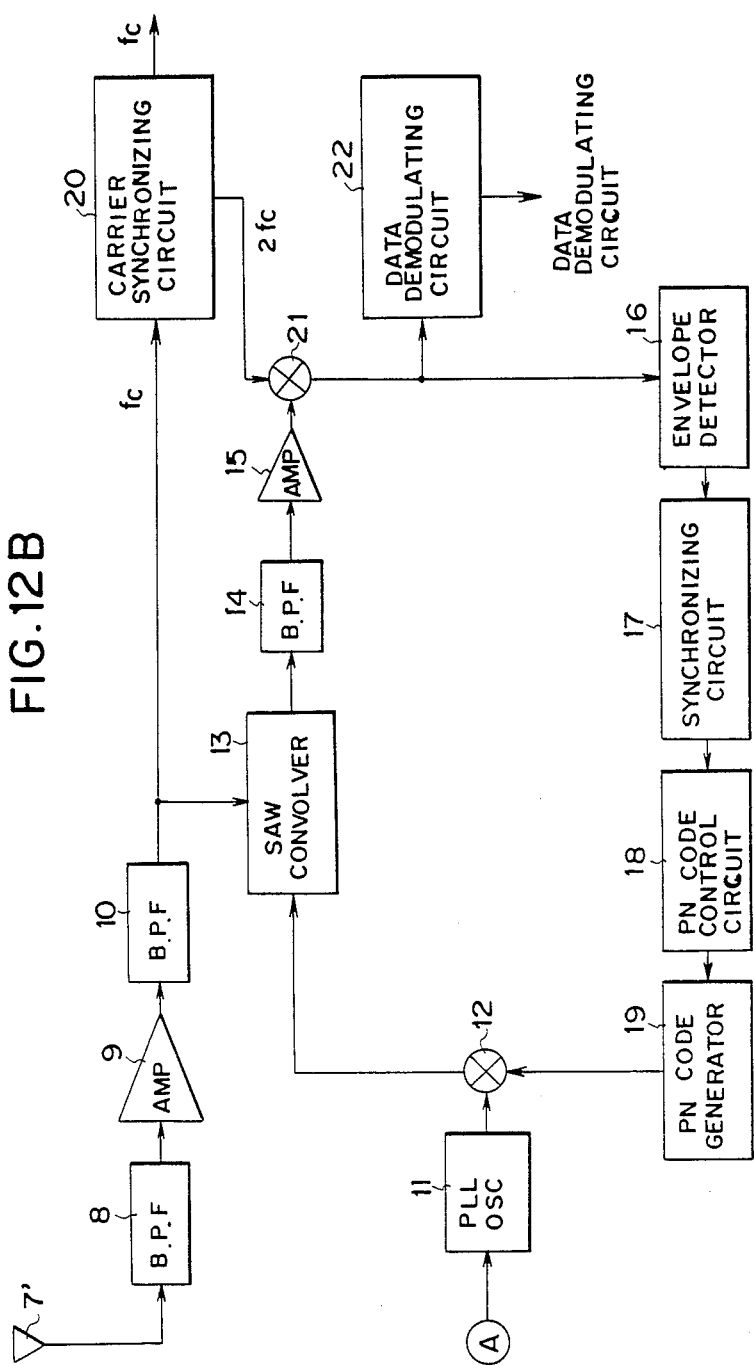

SPREAD-SPECTRUM COMMUNICATION APPARATUS

FIELD OF THE INVENTION

This invention relates to an improved spectrum communication apparatus for transmitting and receiving various information by a spread-spectrum system.

BACKGROUND OF THE INVENTION

Heretofore, various communication systems have been discussed and developed. A spread-spectrum communication system is known as one of these systems.

The spread-spectrum communication system is such that a transmitter sends a narrow-band signal indicative of data or voice by spreading out the bandwidth, using a pseudonoise code (PN code), and that a receiver reproduces the original signal by inversely spreading out the wideband received signal into the original narrow-band signal. The spread-spectrum communication system is recently remarked as a very reliable communication system because of such advantages as stability against external interference or noise and high privacy.

The greatest point of the spread-spectrum communication system is a correlator at a receiver side. In a wireless spread-spectrum communication, a correlator presently recognized to be most simple and reliably is an apparatus using a surface acoustic wave (SAW).

As SAW correlators, there are tapped delay line types and convolver types in general. Such a tapped delay line type, although simple in arrangement and generally excellent in efficiency, is largely affected by the temperature factor of a substrate. In contrast, such a convolver type, although not affected so much by changes in the temperature, is generally low in efficiency. However, while the tapped delay line type is fixed in code, the convolver type can change its code as desired.

Therefore, as far as the efficiency is practically acceptable, the convolver type correlator is much easier to use.

FIGS. 12(A) and 12(B) show an arrangement of a spread-spectrum communication apparatus using a prior art SAW convolver. In a transmitter side of FIG. 12(A), a mixer 1, for example, effects binary-phase modulation of a carrier from an oscillator 2, using a signal (digital in this case) to be sent, to first effect primary narrow-band modulation. Subsequently, a mixer 3, for example, effects binary-phase modulation using a PN code of a PN code generator 4 having a fast bit rate of a much wider band than an information signal to be sent, so as to spread out the spectrum and transmit it from the antenna 7, after passing it through a band-pass filter 5 and an amplifier 6.

In a receiver side of FIG. 12(B), a spread-spectrum signal received by an antenna 7′ is first high-frequency-amplified by an amplifier 9 and band-pass filters 8 and 10, and is subsequently applied to a SAW convolver 13.

The SAW convolver 13 is supplied with a reference signal which is made by a mixer 12 by binary-phase-modulating a carrier from an oscillator 11 which oscillates the same carrier frequency as a received signal input of the SAW convolver, using a PN code generator for generating a PN code which is time-inversed with respect to the PN code 4 of the transmitter side.

The PN code used as the reference signal is held in synchronization with the received PN code from the transmitter side by an envelope detector 16, a synchronizing circuit 17 and a PN code control circuit 18. At this time, an output from the convolver 13 (whose frequency is 2fc, twice the input carrier), while maintained in synchronization with the carrier of the received signal by a synchronizing circuit (its center frequency is 2fc), first passes through a mixer 21 via a band-pass filter 14 and an amplifier 15 and is subsequently sent to the envelope detector 16 for the purpose of the aforementioned PN code synchronization. When the PN code and the carrier synchronize with each other, primary data of baseband information is obtained from a data demodulating circuit 22.

In the prior art spread-spectrum communication apparatus, however, synchronization of the PN code and the carrier is indispensable, and this makes it difficult to simplify the receiver arrangement. This is a serious problem for practical use thereof.

OBJECT OF THE INVENTION

It is therefore an object of the invention to provide a spread-spectrum communication apparatus capable of reproducing information, not requiring synchronization with the PN code and the carrier.

SUMMARY OF THE INVENTION

In order to attain the above-indicated object, the invention provides spread-spectrum communication apparatuses having the following arrangements, respectively.

A spread-spectrum communication apparatus according to a first invention comprises:

a transmitter apparatus including primary modulating means for modulating a carrier frequency by baseband information of data to be transmitted; and secondary modulating means for effecting secondary modulation by a predetermined PN code and transmitting a spread-spectrum transmission signal; and a receiver apparatus including a convolver supplied with a received spread-spectrum signal and a reference signal PN code in said transmitter apparatus and time-inverted with respect to the PN code in said transmitter apparatus to correlate them; means for detecting a row of peak pulses outputted from said convolver; and demodulating means having a pulse width expanding circuit responsive to respective pulses of said detected row of pulses to generate the baseband information.

A second invention comprises:

the same transmitter apparatus as that of the first invention; and a receiver apparatus including a convolver supplied with a received spread-spectrum signal and a reference signal PN code non-synchronous with the carrier frequency and the PN code in said transmitter apparatus and time-inverted with respect to the PN code in said transmitter apparatus to correlate them; waveform shaping means for detecting and shaping a row of peak pulses outputted from said convolver; and a pulse count demodulator for counting the number of output pulses of said waveform shaping means and demodulating said baseband information.

A third invention comprises:

the same transmitter apparatus as that of the first invention; and a receiver apparatus including first and second convolvers supplied with a received spread-spectrum signal and two reference signals which are different in the center frequency, non-synchronous with the carrier frequency and the PN code in said transmitter apparatus and time-inverted with respect to the PN code in said transmitter apparatus to correlate them; first and second detecting means for detecting rows of peak pulses outputted from respective said convolvers; and a comparing demodulator for comparing output pulse rows of said first and second detecting means and demodulating said baseband information.

A fourth invention comprises:

the same transmitter apparatus as that of the first invention; and a receiver apparatus including a convolver supplied with a received spread-spectrum signal and switchingly selected one of two reference signals which are different in the center frequency, non-synchronous with the carrier frequency and the PN code in said transmitter apparatus and time-inverted with respect to the PN code in said transmitter apparatus to correlate them; waveform-shaping means for detecting and shaping a row of peak pulses outputted from said convolver; and a comparing demodulator for comparing output pulse rows corresponding to respective said center frequencies outputted from said waveform shaping means and demodulating said baseband information.

In the above-indicated receivers, the demodulation process by a carrier and a PN code is effected in a non-synchronous condition, and for this purpose, the PN code repeating speed is selected to be sufficiently larger than the information speed to be transmitted.

BRIEF DESCRIPTION OF THE DRAWINGS

FIGS. 1(A) and 1(B) are block diagrams of a first embodiment of the invention;

FIGS. 8(A) and 8(B) are block diagrams showing a second embodiment of the invention;

FIGS. 9(A) and 9(B) are block diagrams showing a third embodiment of the invention;

FIGS. 11(A) and 11(B) are block diagrams of a fifth embodiment of the invention; and FIGS. 12(A) and 12(B) are block diagrams of a prior art spread-spectrum communication apparatus.

DETAILED DESCRIPTION

Figure 2:
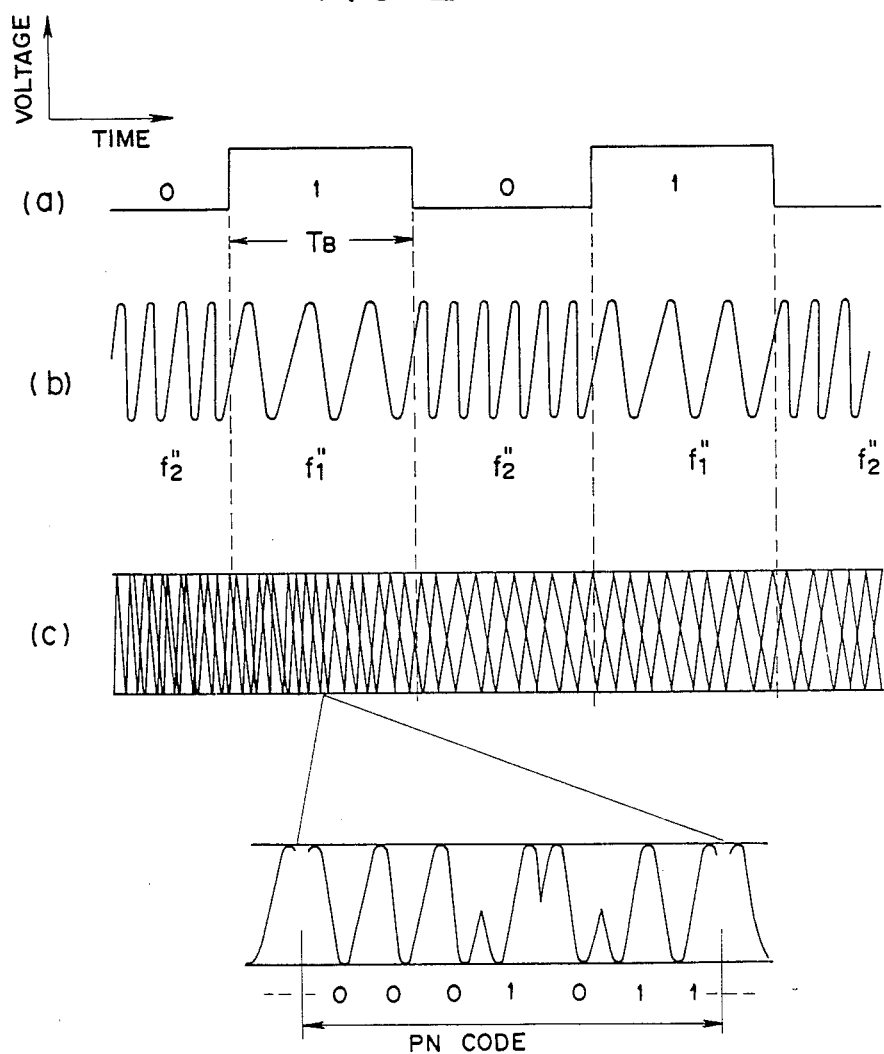
FIG. 2 shows operating waveforms at respective portions of a transmitter apparatus in the first embodiment of FIGS. 1(A) and 1(B)

The invention is described below in detail, referring to respective embodiments illustrated in the drawing.

FIGS. 1(A) and 1(B) show an arrangement of an inventive non-synchronous spread-spectrum communication apparatus. In the transmitting apparatus of FIG. 1(A), a carrier is FSK-modulated in a clock control circuit 23 to change its frequency into $f'_1$ or $f'_2$, using baseband information in the form of digital data, and $f'_1$ and $f'_2$ are changed to $f''_1$ and $f''_2$ by a frequency multiplying circuit 25. Its output is further BPSK (binary phase-shift keying)-modulated by a PN code of a PN code generator 4 in a mixer 3. In this case, it is not necessary to synchronize the PN code with the baseband information. An output of the mixer 3 is frequency-converted into a desired RF frequency band (for example, $f'''_1$ or $f'''_2$) by an oscillator 28 and a mixer 27, and it is transmitted from an antenna 7.

In the receiver of FIG. 1(B), a SAW convolver 13 is supplied with a reference signal which is obtained by BPSK-modulating a carrier from an oscillator 11 of oscillating frequency $f_1$, using a PN code generator 19 which generates a code not synchronous with the carrier and PN code of the transmitter side and timewise inverted from the transmitter side. Therefore, the convolver 13 outputs a row of correlation peaks only when the frequency of a received signal is $f_1$ and both PN codes coincide. As a result, presence and absence of such row of correlation peaks correspond to "H" level and "L" level of the baseband information. The correlation peaks, after detected by an envelope detecting circuit 16 and waveform-shaped by a comparator 33, are formed into a baseband information demodulated output by a pulse width expanding circuit 34. These demodulating processes are performed under non-synchronization of carriers and PN codes between the transmitter side and the receiver side.

Particulars of the operation of the non-synchronous spread-spectrum communication apparatus shown in FIGS. 1(A) and 1(B) are explained, referring to illustrated operating waveforms of respective portions and illustrated practical circuit arrangements.

FIG. 2 shows voltage waveforms at portions (a), (b) and (c) of the transmitter apparatus shown in FIG. 1(A).

Portion (a) is the baseband information which is digital data in this embodiment. This may be analog data in general.

In FIG. 2, (a) is a digital signal. A clock of frequency $f'_1$ in "H" level ("1" condition) or frequency $f'_2$ in "L" level ("0" condition) is generated in response to a digital signal at (a) entered in the digital clock control circuit 23. After this, carrier $f''_1$ responsive to the original digital signal "1" or $f''_2$ responsive to "0" is generated at point (b) of FIG. 1(A) in the waveform (b) in FIG. 2 by a low-pass filter (L.P.F.) 24 and the frequency multiplying circuit 25. This means that the carrier frequency is frequency-converted by the digital signal, and it is one form of a so-called FSK modulation.

Regarding selection of $f_1$ and $f_2$ in the intermediate frequency band within the receiver, when the carrier frequency of the reference signal in the SAW convolver 13 in the receiver is $f_1$ which is within the bandwidth of the SAW convolver, $f_2$ in the received signal may be any frequency which causes a great decrease in a SAW convolver output.

In most cases, when the center frequency of a reference signal entered in the SAW convolver 13 is $f_1$, the SAW convolver output is decreased extremely when the difference $\Delta f$ from the center frequency $f_2$ of a received signal ($\Delta f = |f_1 - f_2| = |f''_1 - f''_2|$) is an integer multiplication of fg (inverse number of the time for propagation of SAW on a convolution gate electrode of a SAW convolver) or exceeds fg.

Therefore, $\Delta f = |f_1 - f_2|$ is selected to be any one of integer multiplications of fg, its approximates or above fg. In case of allotment of transmission channels, differences between $f_1$ and $f_1$ and between $f''_1$ and $f''_1$ of respective channels are selected to be any one of integer multiplications of fg or its approximates. Since the amplitude is constant in this modulation, it is possible to effectively activate an AGC circuit 31 at the intermediate frequency (IF) stage in the receiver.

As an example, by selecting the frequencies generated by the digital clock control circuit 23 as $f'_1 = 26.875$ MHz and $f'_2 = 27.000$ MHz and multiplying them by 8 in the frequency multiplying circuit 25, $f''_1 = 215$ MHz and $f''_2 = 216$ MHz were readily obtained. Allotment of $f''_1$ and $f''_2$ may be opposite respective frequencies. Further, in case of the SAW convolver used in this embodiment, fg was about 110 KHz, the center frequency was 215 HHz, and the bandwidth was 23 MHz (output 3 dB down).

Modulation effected heretofore is the primary modulation where a digital signal, for example, used as baseband information was FSK-modulated.

After this, a secondary modulation by a PN code is effected for spreading out the spectrum. From the clock generator 26 and the PN code generator 4 of the transmitter shown in FIG. 1(A), a PN code is produced and applied to the double-balanced mixer 3 together with the carrier which has been FSK-modulated into $f''_1$ or $f''_2$ Thus a so-called DS (direct sequence) modulation by a PN code is performed, and as the waveform at (c) of the transmitter, a secondary-modulated waveform by a PN code as shown at (c) of FIG. 2 is obtained.

At this time, an important point is that no synchronization is required among the PN code, digital data as the baseband information and the carrier of $f''_1$ or $f''_2$ for the purpose of simplification without spoiling the capacity of the transmitter.

In this embodiment, the primary modulation was effected in the form of FSK modulation, using digital data as the baseband information. It may be modified to another form using analog digital information, etc. as the baseband information, and the primary modulation may be any one of normal FM, AM, SSB and other modulating systems. However, for the purpose of a stable communication by an AGC circuit, FM or phase modulating system is preferable. Further, although the secondary modulation was described as using the system wherein the carrier is phase-modulated by the PN code in the double-balanced mixer, it is sufficient that the secondary modulation performs spectrum spreading of the baseband information, not synchronizing the baseband information with the PN code and the carrier, and any one of FM or phase modulation and other methods is acceptable. Further, any modulator suitable for respective modulating methods may be used in lieu of the double-balanced mixer.

In order that the transmitted signal is reproduced in the receiver in a non-synchronous condition, the PN code repeating speed must be larger than the speed of the transmitted information to be transmitted, in the modulating process.

In the waveforms in the transmitter shown in FIG. 2, when the width of one pulse of the digital data (a) as the baseband information is $T_B$, and the length of one sequence of the PN code is 2T, the following relationship must be satisfied:

$$T_B >> T \quad (1)$$

Preferably, $T_B$ is more than 10 times T or 100 times T to ensure a reliably communication even of a non-synchronous type.

The spread-spectrum signal (c) obtained by primary and secondary-modulating the baseband information passes through the RF frequency converter and is finally sent from the antenna 7. The RF frequency converter behaves to convert the transmitting propagation band into a desired frequency, and consists of an oscillator 28, a mixer 27, a band-pass filter 5 and an amplifier 6.

Figure 3:
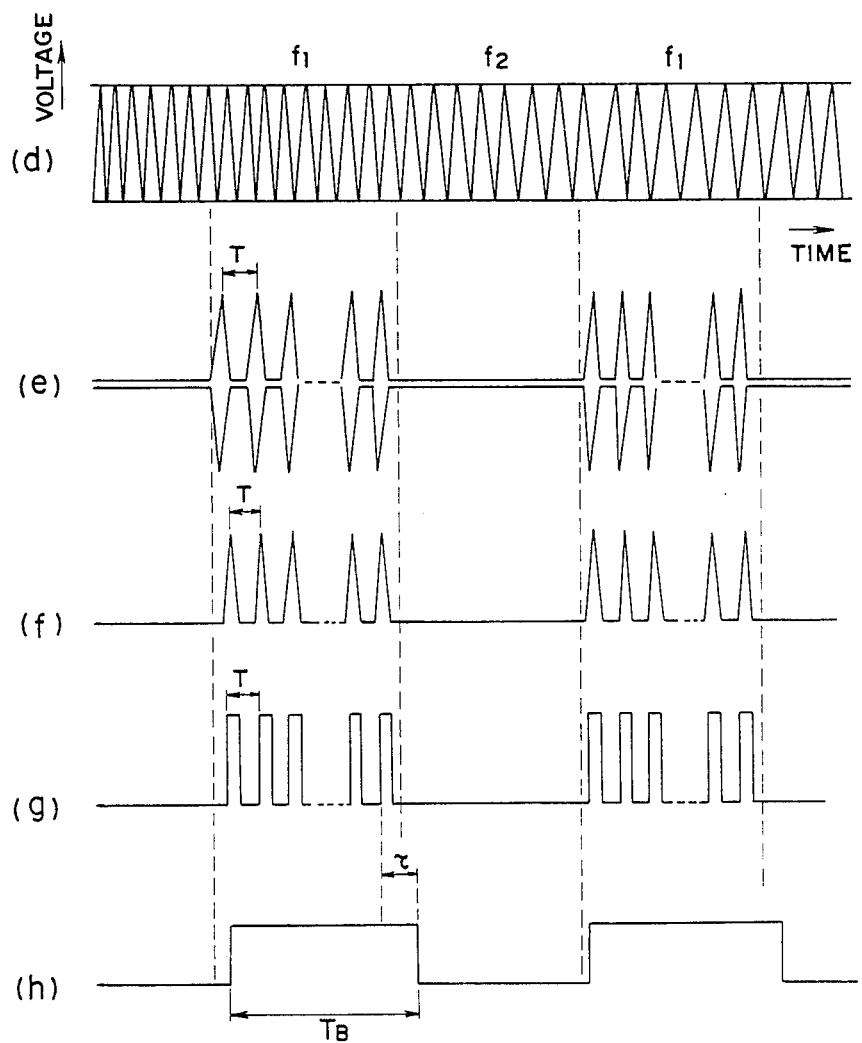
FIG. 3 shows operating waveforms at respective portions of a receive apparatus in the first embodiment of FIGS. 1(A) and 1(B)

Next, the operation of the receiver shown in FIG. 1(B) is explained in detail. Voltage waveforms at (d), (e), (f), (g) and (h) portions in the receiver are shown in FIG. 3.

At first, the reception antenna 7' receives the spread-spectrum signal of center frequency $f'''_1$ or $f'''_2$ from the transmitter side. At this time, it is immaterial that various noises enter in the antenna; e.g., that noises are larger than the spread-spectrum signal, because a SAW convolver 13 described later and a modulation system which is called a pulse width expanding system can improve the S/N ratio and reproduce the signal among the noises. In case of extracting an information signal hidden in noises, it is very difficult to establish synchronization with the signal hidden in the noises in the prior art modulating system which requires synchronization. However, the complete non-synchronous system according to the embodiment can very readily improve the S/N and reproduce the information among the noises.

In this case, noises are undesired electric waves such as interference waves, city noises and thermal noises other than the information.

The spread-spectrum signal of center frequency $f'''_1$ or $f'''_2$ entered in the antenna 7' is amplified in the band-pass filter 8 and the amplifier 9, and is subsequently converted into $f_1$ or $f_2$ of an intermediate frequency band by a local oscillator 29 and a mixer 30.

At this time, since the modulated signal sent from the transmitter side is a signal having a constant amplitude, e.g., in this case, a FSK signal of $f_1$ or $f_2$, the AGC circuit 31 readily operates, and fading or other instability of the received wave intensity can be removed.

The most important means for reproducing the signal hidden in noises is the SAW convolver 13. The received signal (d) is applied as one of inputs to the SAW convolver. Its waveform is the spread-spectrum signal of center frequency $f_1$ or $f_2$ shown in FIG. 3.

A reference signal is applied as another input to the SAW convolver. This is obtained by modulating a since wave of carrier frequency $f_1$ in the same binary phase-shift keying (BPSK) as the transmission process, using a PN code obtained by time-inverting the same code as the PN code in the received signal, in a non-synchronous relationship with the carrier. The oscillator 11 is activated to oscillate at $f_1$, and the PN code for the reference signal is generated in the clock generator 32 and the PN code generator 19, and the carrier of $f_1$ is BPSK-modulated in the mixer 12.

The output from the SAW convolver 13 is a correlation output of the received signal and the reference signal, and when the center frequency $f_1$ of the carrier and the PN code coincide (the reference PN codes coincide in a time-inverted relationship), a row of convolution peaks is outputted at (e) of FIG. 1(B) at time interval T in the waveform of (e) of FIG. 3. At this time, T is half the sequence of the PN code. When the center frequency of the carrier of the received signal is $f_2$, no convolution peak row is out. The process of selecting $f_2$ per one $f_1$ is as described before. Respective communication channels can be established by selection of $f_1$ and $f_2$ (similarly, $f''_1$ and $f''_2$) and selection of the PN code.

When the center frequency of the carrier of the received signal is $f_1$, a row of convolution peaks is out at (e) of the receiver as shown at (e) of FIG. 3. When it is envelope-detected by the envelope detector 16, it becomes (f) of FIG. 3. When it further passes through the comparator 33, its waveform is shaped as shown as (g) of FIG. 3, and a row of pulses at time interval T is obtained in the period of center frequency $f_1$ of the carrier.

By passing through the pulse row through the pulse width expanding circuit 34, digital data of pulse width $T_B$ which is the original baseband information is demodulated and outputted as shown at (h) of FIG. 3.

The pulse width expanding circuit 34 may be a re-triggerable one-shot IC which is triggered upon every pulse of the row of pulses at time interval T of (g) and generates a pulse of width $\tau$.

When the period of the row of output peaks of the convolver is T, and the time constant of the pulse width expanding circuit 34 is selected to satisfy the following relationship:

$$T < \tau \qquad (2)$$

outputs of "H" (="1") level are held as long as the row H" of pulses continues.

Further, when the received signal is $f_2$ at (e) of FIG. 3, i.e. when the level of the digital data of the baseband information to be transmitted is "L" (="0"), no output peak row is out from the convolver. Therefore, also at (f) and (g) of FIG. 3, no pulse row is out, and the final demodulated output of (h) is maintained at "L" (="0").

As shown at (h) of FIG. 3, when the received signal is changed from $f_1$ period to $f_2$ period and the pulses row of (g) does not appear, the level of (h) becomes "L" (="0") on time constant $\tau$ after the final pulse. In contrast, when the received signal is changed from $f_2$ period to $f_1$ period and a pulse row of (g) is outputted, the level of (h) becomes "H" (="1") immediately.

Therefore, a jitter of the maximum $\tau$ is produced in the demodulated output according to this system. However, as shown in expression (1), by selecting a sufficiently large PN code repeating speed, the jitter of $\tau$ can be disregarded.

In this embodiment, the time constant of the pulse width expanding circuit with respect to the interval of the correlation peak pulse output may be selected so that the pulse width expanding circuit 34 can operate to integrate the pulse row generated in $f_1$ period or an output signal in general and improve the S/N.

Circuit arrangements used at respective portions in the embodiment of the spread-spectrum transmitting and receiving apparatus shown in FIGS. 1(A) and 1(B) are shown below.

This is only an example, and it is basically sufficient that circuit blocks performing the functions described heretofore are disposed in respective portions. That is, it should not be construed to limit realization of a simple non-synchronous spread-spectrum communication apparatus.

Figure 4:
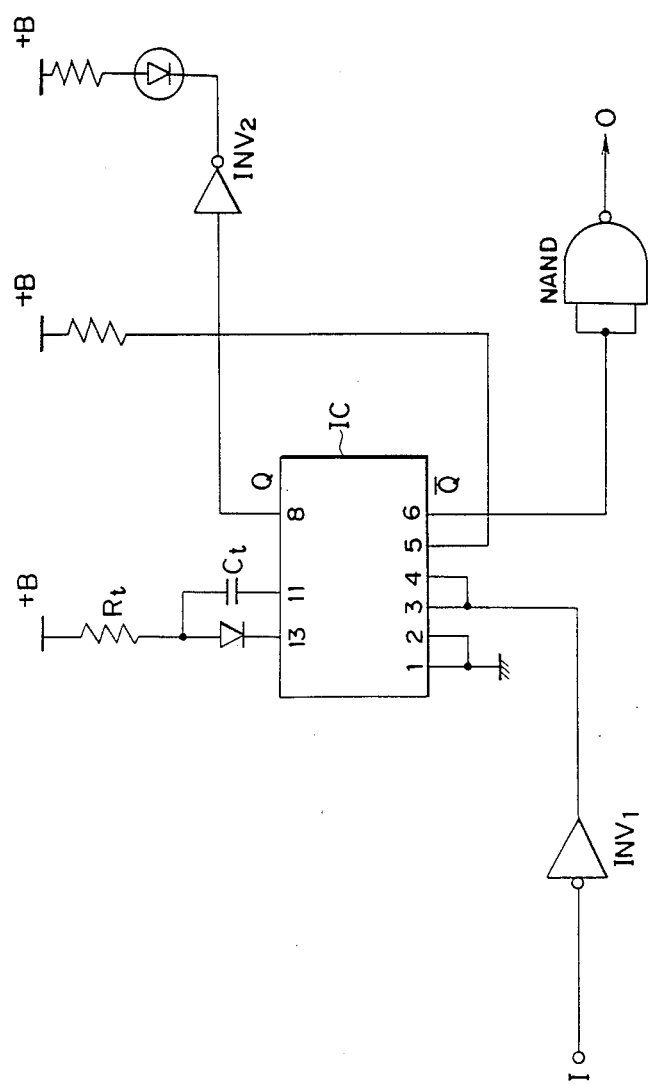
FIG. 4 is a view showing an arrangement of a pulse width expanding circuit in the embodiment of FIGS. 1(A) and 1(B)

At first, FIG. 4 shows an embodiment of the pulse width expanding circuit 34. As described above, the pulse width expanding circuit must adjust the time constant $\tau$ to satisfy expression (2). In this embodiment, $\tau$ is determined by a resistor $R_T$ and a capacitor $C_T$ in the drawing and it is expressed by:

$$\tau = K C_T R_T \qquad (3)$$

where K is a constant. In FIG. 4, IC refers to the re-triggerable one-shot IC circuit, I to an input terminal, O to an output terminal, $INV_1$ and $INV_2$ to inverters, and NAND to a NAND circuit.

Figure 5:
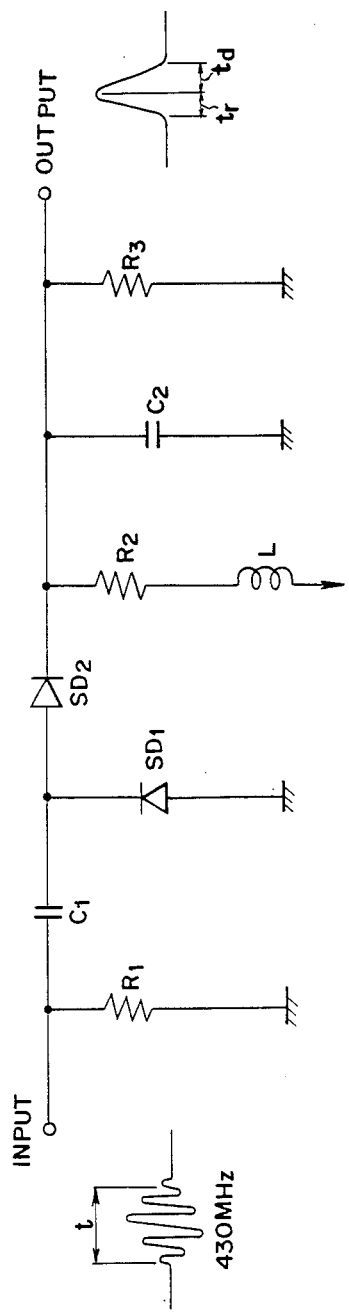
FIG. 5 is a view showing an arrangement of an envelope detector in the embodiment of FIGS. 1(A) and (B)

Next, FIG. 5 shows an example of the envelope detector 16 which consists of Schottky diodes $SD_1$ and $SD_2$ resistors $R_1$ to $R_3$, capacitors $C_1$ and $C_2$ and coil L.

The detecting circuit detects the input waveform of a pulse put on a frequency twice the carrier of $f_1$ and generates an output pulse in the illustrated form.

When expressing the rising of the output pulse by $t_r$ and the dropping by $t_2$, $t_r$ is established to be responsive to $2f_1$, and $t_d$ is selected to be longer than t of an RF pulse of the correlation peak input shown in the drawing and shorter than interval T of the above-described pulse row.

Thus by setting $t_r$ and $t_2$, a stable detected pulse row is obtained as shown at (f) of FIG. 3.

Figure 6:
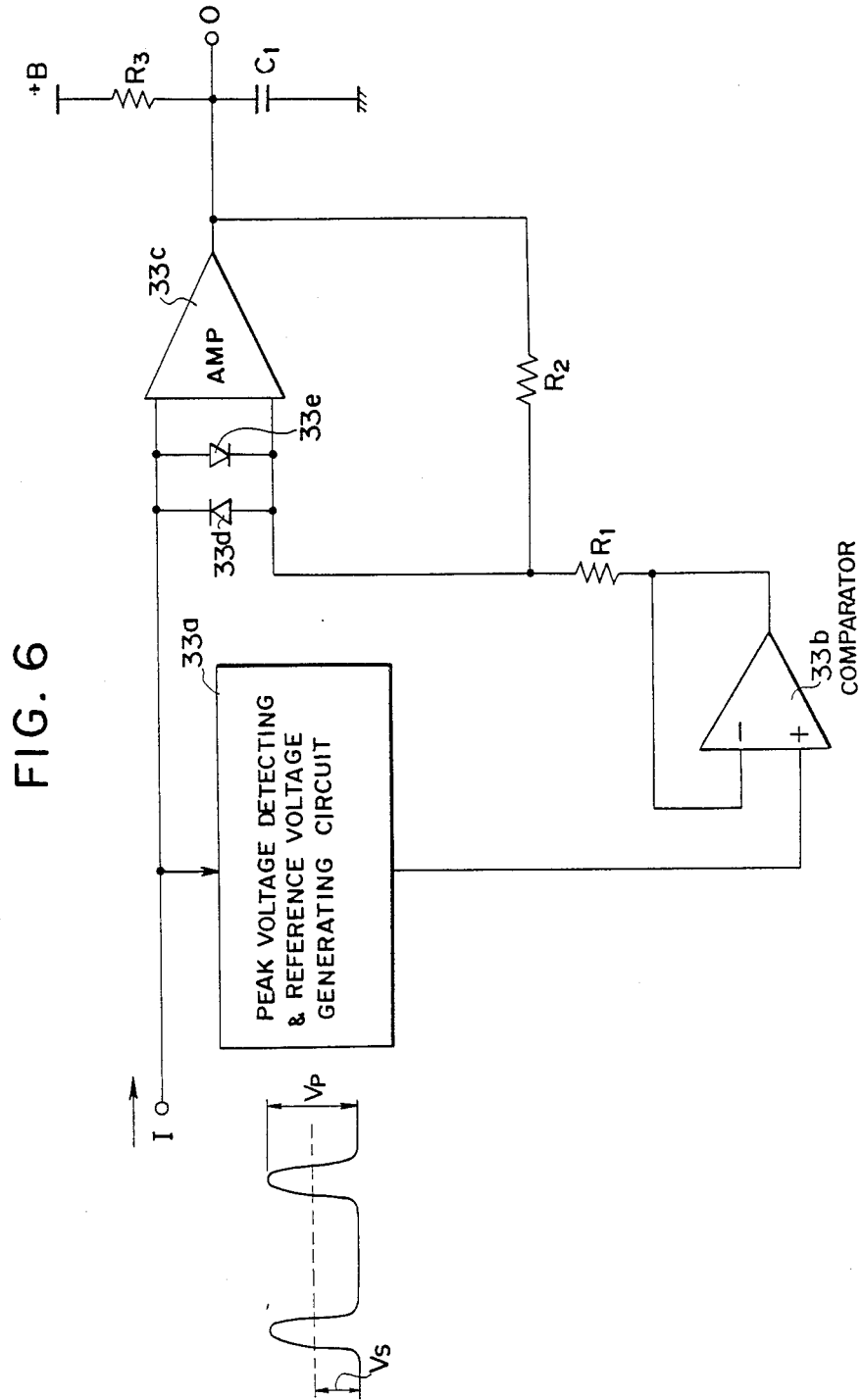
FIG. 6 is a view showing an arrangement of a comparator circuit in the embodiment of FIGS. 1(A) and 1(B)

Further, FIG. 6 shows an example of the comparator 33. It is an important point for arrangement of the comparator that the comparator must be speedy enough to respond to T because the repeating period T of the pulse row is speedy. Further, in order to meet level changes, it is necessary to use automatic level control means so as to automatically adjust the S/N into a good value to perform a reliable communication. The automatic level control means sets the threshold VS at an intermediate point between the noise level and VP, by detecting in a circuit 33a the peak voltage VP of a pulse of an envelope detection output signal of an input to generate a reference voltage and apply it to a comparator 33c. Reference numerals 33d and 33e designate diodes.

Figure 7:
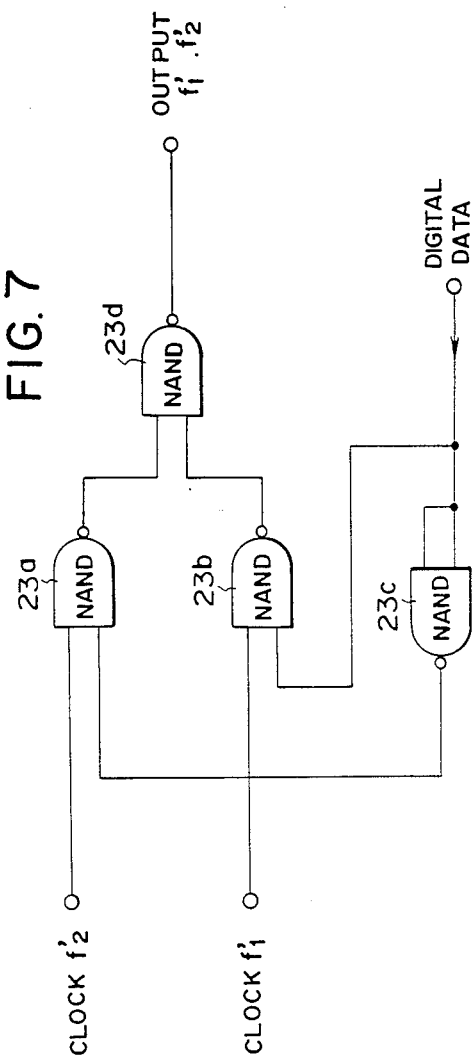
FIG. 7 is a view showing an arrangement of a digital clock control circuit in the embodiment of FIGS. 1(A) and 1(B)

Next, FIG. 7 shows an example where a simple arrangement of the digital clock control 23 disposed in the receiver is realized. In this example, frequencies $f'_1$ and $f'_2$ are switched by NAND gates 23a to 23d in response to a digital data input.

Figure 8B:
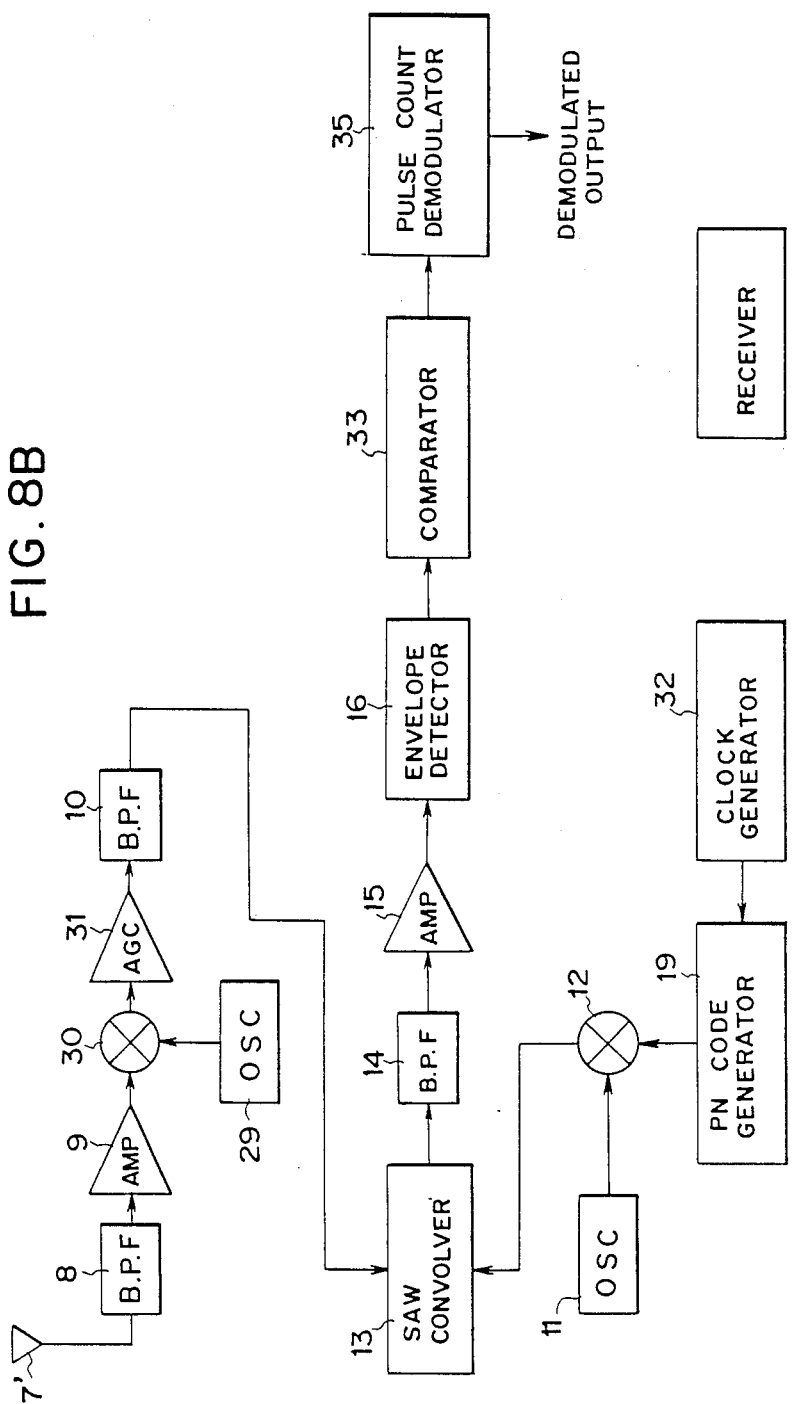

FIGS. 8(A) and 8(B) show a second embodiment of the inventive spread-spectrum communication apparatus. This is a so-called pulse count system.

The transmitter of FIG. 8(A) has the same arrangement as that of FIG. 1(A). The first embodiment uses the pulse width expanding circuit 34 in the receiver as shown in FIG. 1(A). In this embodiment, however, a pulse count demodulator 35 is employed so that after a convolution peak is detected by the envelope detector 16 and its waveform is shaped by the comparator 33, the pulse count demodulator 35 counts up and integrates the number of pulses (g) of FIG. 3 to demodulate the baseband information. Although the pulse count system is more complicated than the pulse width expanding circuit system in the embodiment of FIGS. 1(A) and 1(B), it is effective for a more reliable communication.

Figure 9B:
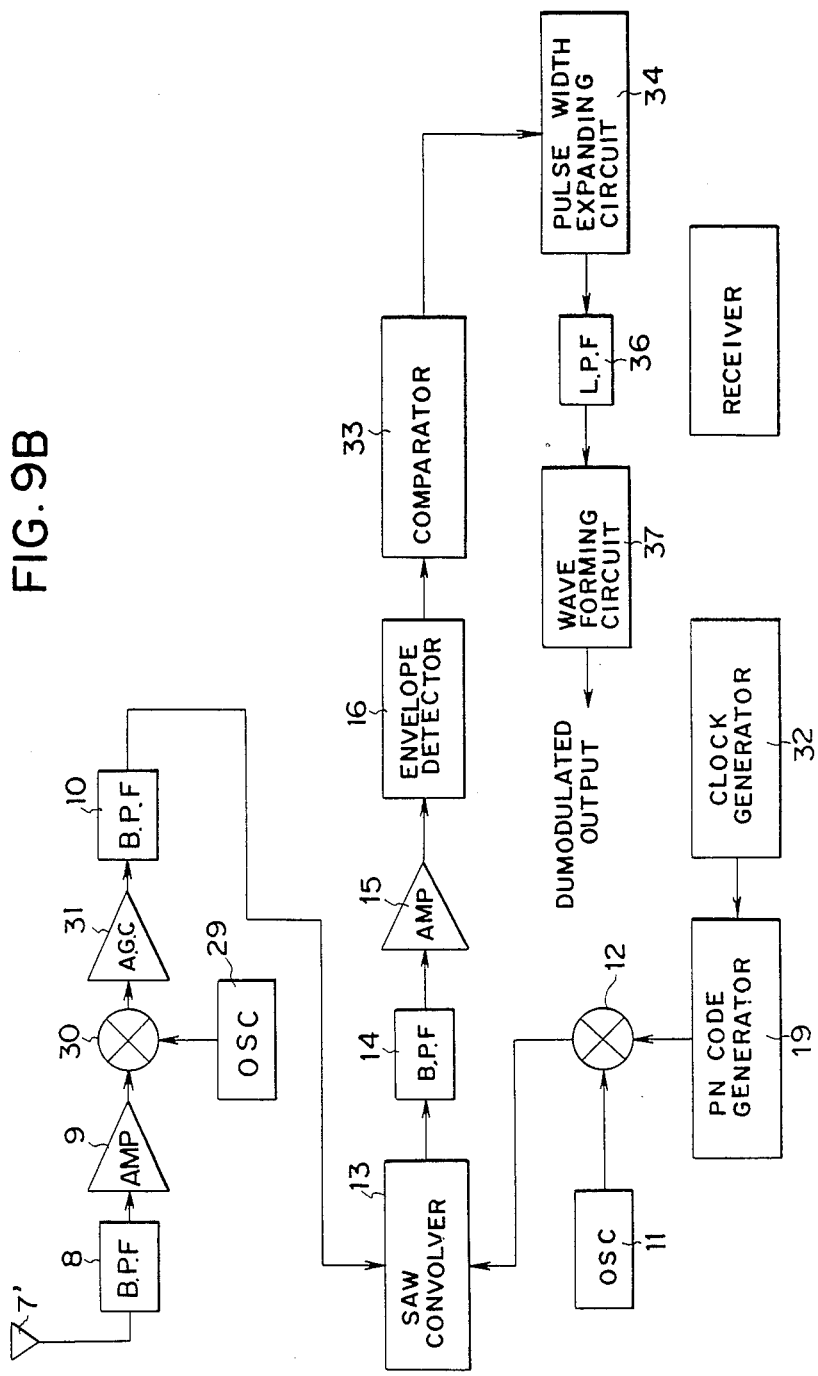

FIGS. 9(A) and 9(B) show a third embodiment of the inventive spread-spectrum communication apparatus. This is a so-called "pulse expanding and integrating circuit" system. The transmitter of FIG. 9(A) has the same arrangement as that of the first embodiment of FIG. 1(A).

The first embodiment uses the output at (h) of FIG. 1 as the baseband information in the receiver. This embodiment, however, passes the output of (h) through a low-pass filter 36 and a waveform shaping circuit 37 to further reduce demodulation errors.

Figure 10A:
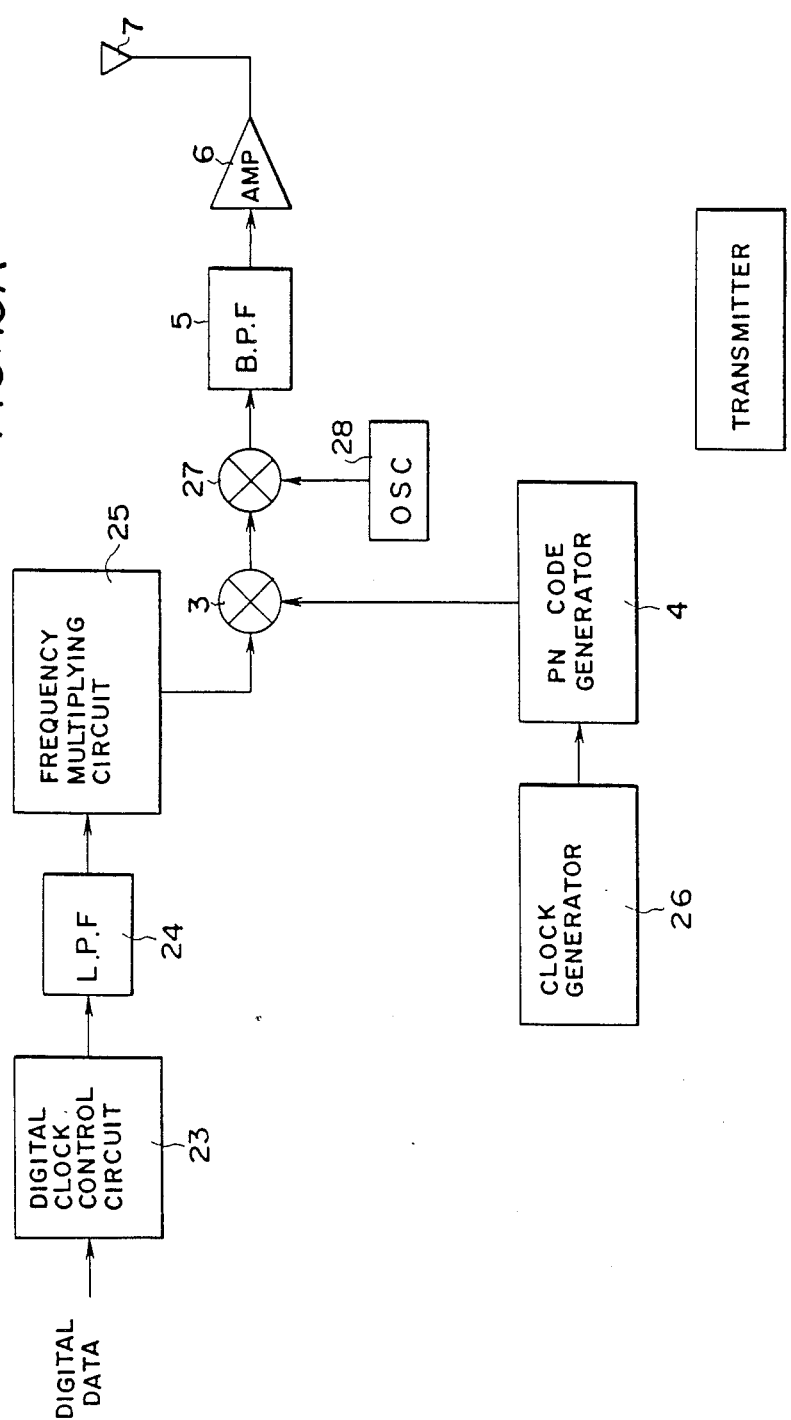
FIGS. 10(A) and 10(B) are block diagrams of a fourth embodiment of the invention.
Figure 10B:
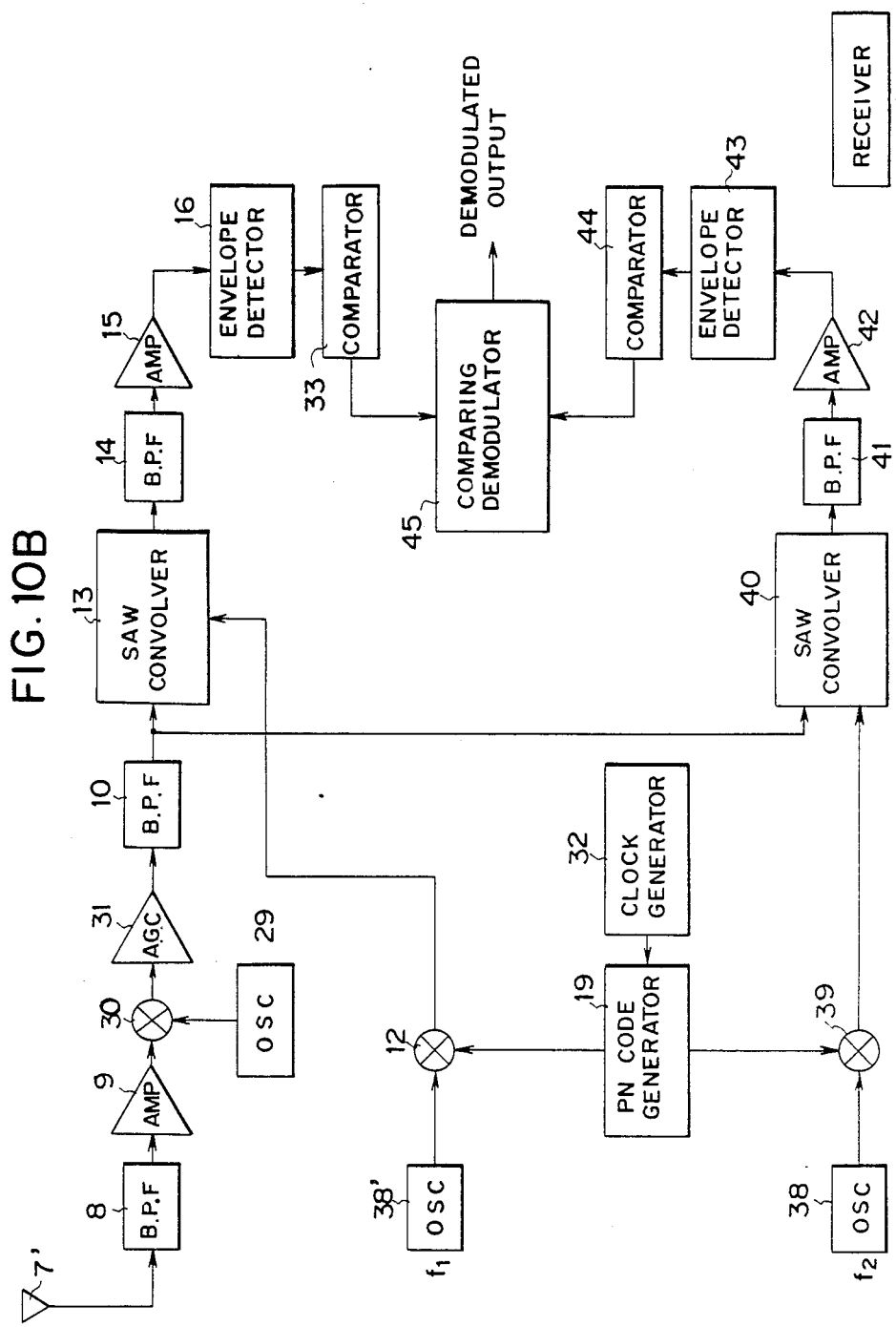

FIG. 10 shows a fourth embodiment of the inventive spread-spectrum communication system. This is a so-called double-convolver system. The transmitter of FIG. 10(A) has the same arrangement as that of the first embodiment shown in FIG. 1(A). This receiver performs FSK demodulation where the center frequency of the carrier is switched between $f''_1$ and $f''_2$ by the baseband information in the form of digital data. In the first embodiment, the receiver uses a simple SAW convolver to generate a pulse row of convolution peaks in only one period of $f_1$ or $f_2$.

In this embodiment, however, the receiver uses two convolvers 13 and 40, and reference signal PN codes of center frequencies $f_1$ and $f_2$ are applied to them respectively. Thus, since a pulse row of convolution peaks is generated from the SAW convolver 13 in $f_1$ period of from the SAW convolver 40 in $f_2$ period, the baseband information could be demodulated by a comparing demodulator 45 in a double reliability with respect to the first embodiment approximately.

Reference numerals 38 and 38' refer to oscillators of oscillating frequencies $f_1$ and $f_2$, 39 to a mixer similar to 12, and 41 through 44 to circuits similar to the respective circuits 14 through 33.

Figure 11B:
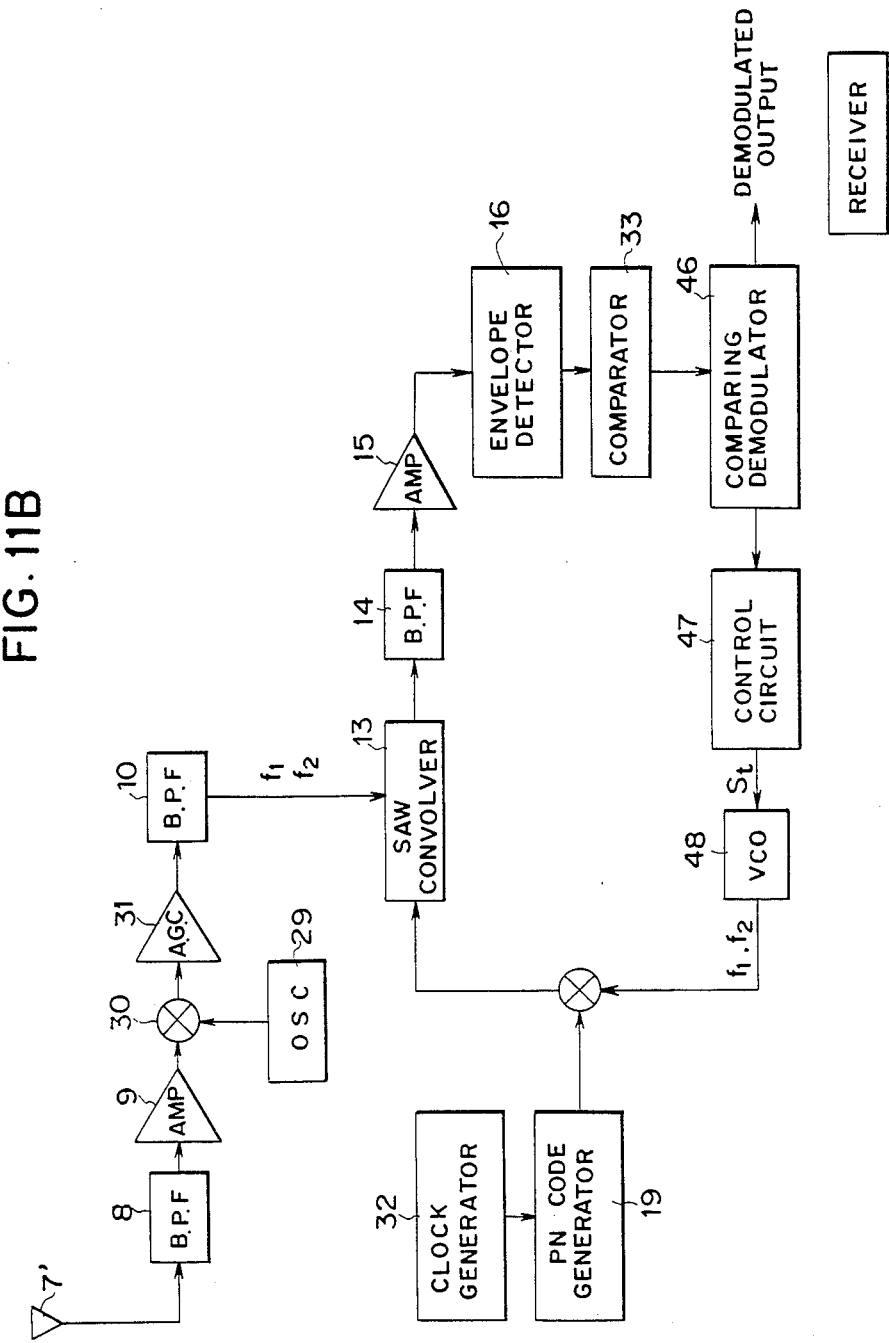
Figure 12A:
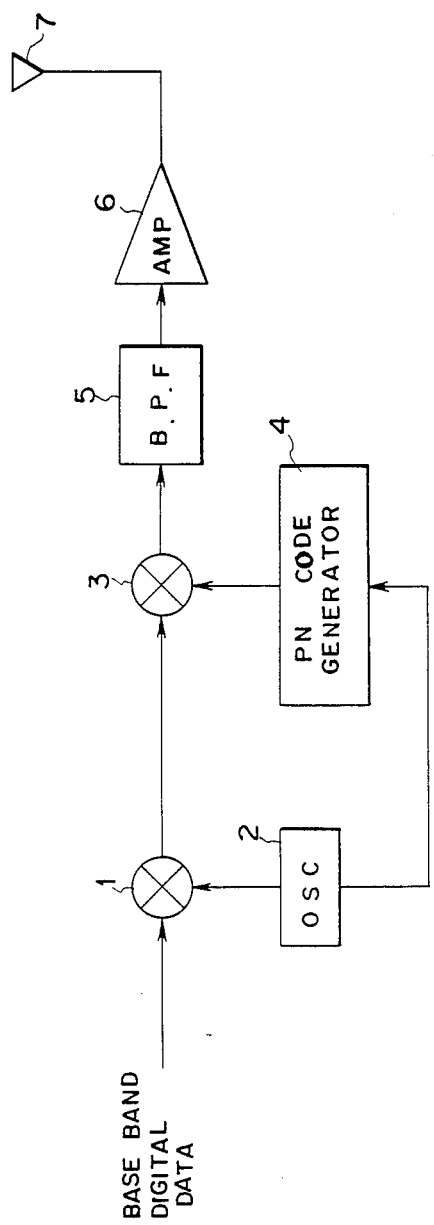

FIGS. 11(A) and 11(B) show a fifth embodiment of the inventive spread-spectrum communication apparatus. This is a so-called double reference signal system. The transmitter of FIG. 11 (A) has the same arrangement as that of the first embodiment of FIG. 1(A). The fourth embodiment uses two convolvers to detect both $f_1$ and $f_2$ periods of the carrier of the received signal. However, this embodiment uses a single SAW convolver 13 and changes the carrier center frequency of the reference signal between $f_1$ and $f_2$ to judge in the comparing demodulator 46 in which case a convolution output is obtained and to demodulate the baseband information.

Reference numeral 48 denotes a voltage control oscillator for switching the carrier center frequency between $f_1$ and $f_2$, and reference numeral 47 designates a control circuit which adjusts the timing for outputting a switching signal St to the oscillator 48 and performs a control to stabilize and maximize an output of the comparing demodulator 46. According to this embodiment, the baseband information can be demodulated in a double reliability with respect to the first embodiment.

As described above, according to the invention, since the spread-spectrum communication apparatus does not use a synchronizing circuit, less erroneous, highly reliable information communication is ensured, using very simple transmitting and receiving apparatuses. Particularly, this nature is a great advantage in case of communication using weak electric waves.

What is claimed is:

1. A spread-spectrum communication apparatus comprising:
    a transmitter system including primary modulating means for modulating a carrier frequency by baseband information of data to be transmitted; and secondary modulating means for effecting secondary modulation by a predetermined PN code and transmitting a spread-spectrum transmission signal; and
    a receiver apparatus including a convolver supplied with a received spread-spectrum signal and a reference signal PN code non-synchronous with the carrier frequency and the PN code in said transmitter apparatus and time-inverted with respect to the PN code in said transmitter apparatus to correlate them; means for detecting a row of peak pulses outputted from said convolver; and demodulating means having a pulse width expanding circuit responsive to respective pulses of said detected row of pulses to generate the baseband information.

2. A spread-spectrum communication apparatus comprising:
    a transmitter apparatus including primary modulating means for modulating a carrier frequency by baseband information of data to be transmitted; and secondary modulating means for effecting secondary modulation by a predetermined PN code and transmitting a spread-spectrum transmission signal; and
    a receiver apparatus including a convolver supplied with a received spread-spectrum signal and a reference signal PN code non-synchronous with the carrier frequency and the PN code in said transmitter apparatus and time-inverted with respect to the PN code in said transmitter apparatus to correlate them, waveform shaping means for detecting and shaping a row of peak pulses outputted from said convolver; and a pulse count demodulator for counting the number of output pulses of said waveform shaping means and demodulating said baseband information.

3. The spread-spectrum communication apparatus according to claim 1 wherein said demodulating means includes a low-pass filter and a waveform shaping circuit so that an output of said pulse width expanding circuit is extracted through said low-pass filter and said waveform shaping circuit.

4. A spread-spectrum communication apparatus comprising:
    a transmitter apparatus including primary modulating means for modulating a carrier frequency by baseband information of data to be transmitted; and secondary modulating means for effecting secondary modulation by a predetermined PN code and transmitting a spread-spectrum transmission signal; and
    a receiver apparatus including first and second convolvers supplied with a received spread-spectrum signal and two reference signals which are different in the center frequency, non-synchronous with the carrier frequency and the PN code in said transmitter apparatus and time-inverted with respect to the PN code in said transmitter apparatus to correlate them; first and second detecting means for detecting rows of peak pulses outputted from respective said convolvers; and a comparing demodulator for comparing output pulse rows of said first and second detecting means and demodulating said baseband information.

5. A spread-spectrum communication apparatus comprising:
    a transmitter apparatus including primary modulating means for modulating a carrier frequency by baseband information of data to be transmitted; and secondary modulating means for effecting secondary modulation by a predetermined PN code and transmitting a spread-spectrum transmission signal; and a receiver apparatus including a convolver supplied with a received spread-spectrum signal and a switchingly selected one of two reference signals which are different in the center frequency, non-synchronous with the carrier frequency and the PN code in said transmitter apparatus and time-inverted with respect to the PN code in said transmitter apparatus to correlate them; waveform shaping means for detecting and shaping a row of peak pulses outputted from said convolver; and a comparing demodulator for comparing output pulse rows corresponding to respective said center frequencies outputted from said waveform shaping means and demodulating said baseband information.

6. The spread-spectrum communication apparatus according to claim 1 wherein said pulse width expanding circuit includes a re-triggerable one-shot circuit, and the time width of the output pulse of said circuit is larger than the time interval of said row of peak pulses.

7. The spread-spectrum communication apparatus according to claim 5 further comprising a voltage control oscillator and a control circuit, and wherein the oscillating frequency of said voltage control oscillator is switched by said control circuit so that different carrier frequencies for said two reference signals are generated.

* * * * *